Jan. 21, 1969  W. F. DELP  3,423,597

RADIATION SENSITIVE POSITION SENSING APPARATUS

Filed June 27, 1966  Sheet 1 of 2

INVENTOR
WINNER F. DELP
BY Seidel & Gonda
ATTORNEYS.

INVENTOR
WINNER F. DELP

BY *Seidel & Gonda*

ATTORNEYS

United States Patent Office 3,423,597
Patented Jan. 21, 1969

3,423,597
RADIATION SENSITIVE POSITION SENSING
APPARATUS
Winner F. Delp, Fort Washington, Pa., assignor to The
Jade Corporation, Beth Ayres, Pa., a corporation of
Pennsylvania
Filed June 27, 1966, Ser. No. 560,520
U.S. Cl. 250—231                        11 Claims
Int. Cl. G01d 5/34

This invention relates to a position sensing apparatus. More particularly, this invention relates to a position sensing apparatus for automatically controlling the function of machine or the like in response to the position of the object being sensed. The object being sensed may or may not be the article which the responsive machine is intended to operate upon.

In many manufacturing processes it is desirable to perform repetitive operations. The timing of these operations often depends upon the position of the article being operated upon or the position of a functionally related object. Moreover, the timing of such operations must, in many instances, be extremely precise.

One example of this type of operation is the production of microcircuits.

The manufacturer of microcircuits often require the repetitive exposure of a substrate coated with a photoresist material to an image focused on its surface. The light for creating the image is generated by a flash lamp and focused by an optical system. Examples of this type of system are found in my co-pending application Serial No. 455,857 filed May 14, 1965, and entitled "Precision Art Work Duplicating Machine" and my co-pending application Serial No. 560,454 filed on June 27, 1966, and entitled "Precision Double Image Duplicating Machine." Both of the foregoing machines require that a flash lamp or other high intensity source of electromagnetic radiation be repetitively triggered when a master plate has been accurately positioned.

It is a general object of the present invention to provide sensing means and an electronic circuit responsive to said sensing means for initiating a machine function in response to the correct positioning of an object. The present invention will be described in connection with the triggering of a source of electromagnetic energy. However those skilled in the art will readily recognize that the invention has general application for controlling many types of machine functions.

Another object of the present invention is to provide a position sensing apparatus.

Still another object of the present invention is to provide a position sensing apparatus that is extremely accurate.

A further object of the present invention is to provide a photosensitive position sensing means and electronic circuit responsive to said photosensitive means for initiating a machine to function.

Yet another object of the present invention is to provide an extremely accurate photosensitive means and electronic circuit for detecting the position of an object and initiating a machine function in response to the arrival of said object at the correct position.

Other objects will appear hereinafter.

For the purpose of illustrating the invention, there is shown in the drawings a form which is presently preferred; it being understood, however, that this invention is not limited to the precise arrangements and instrumentalities shown.

Figure 2:
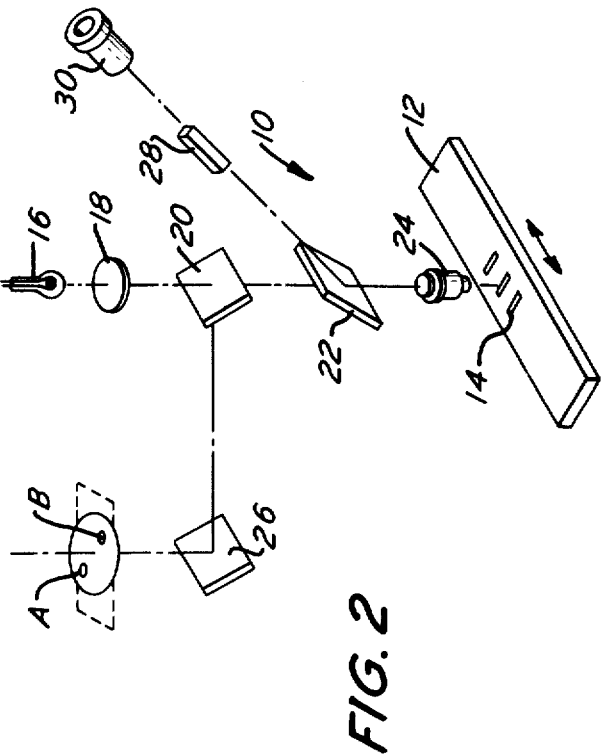
FIGURE 2 is an exploded view of an optical system for the detecting means.

Referring now to the drawings in detail, wherein like numerals indicate like elements, there is shown in FIGURE 2 an exploded view of an optical system designated generally as 10. Those skilled in the art will recognize that the illustrated optical system is representative of several types of systems that may be used.

The optical system 10 is located adjacent a reciprocable object 12 on which have been imprinted a plurality of contrasting lines 14. For reasons that will be apparent below, the lines 14 are formed on the surface of object 12 as accurately as possible. Such accuracy includes both line spacing and line weight. The lines 14 are illustrated in rectangular form for convenience in explaining the invention, but in practice the lines 14 have thicknesses of 300 to 500 micro-inches. The line thicknesses may vary but variations of ±5% have little or no effect on accuracy because the sensor is by analysis concerned only with the center of lines 14.

The reciprocable object 12 represents the article whose position is being sensed. In practice, the object 12 may be part of the microcircuit substraate upon which a photo resist material has been coated. Alternatively, the object 12 may be connected to a reciprocating support table for the microcircuit substrate. In any case, the object 12 has previously been prepared with the lines 14 intended to indicate displacement of the object relative to an initial position, and as will be explained below, to trigger a machine function as they arrive at the correct position. In this case, the machine function will be triggering of a source of electromagnetic energy.

The object 12 is illuminated by a light source 16 whose electromagnetic energy passes through the condenser lens 18, the partially reflecting mirror 20, the partially reflecting mirror 22, and the objective lens 24. Light from source 16 is reflected by the object 12 and lines 14 back through the objective lens 24, through the partially reflecting mirror 22, and then reflected by the partially reflecting mirror 20 to the full reflecting mirror 26. Mirror 26 directs the reflected light onto photocells A and B. Objective 24 may be anywhere from a 20 to 40 power objective with a focal length of sufficient size to form an image of one of the lines 14 on the photocells A, B. Partially reflecting mirror 22 directs some of the light reflected from object 12 through an image correcting prism 28 and into the eyepiece 30. The eyepiece 30 permits visual focusing of object 12 because the eyepiece focal plane and photocell focal plane are related. When one is in focus the other is also in focus. The eyepiece 30 permits the machine operator to manually adjust the position of object 12 if desired. Alternatively the object 12 can be illuminated from a source beneath it. The half-mirrors can be omitted and the objective lens 24 focus an image directly on the photocells.

Figure 4:
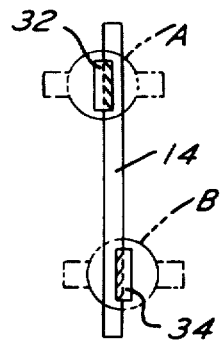
FIGURE 4 is an enlarged view showing the presentation of the magnified image on the photocell apertures.

FIGURE 4 schematically illustrates the formation of a magnified line image on the photocell apertures 32 and 34. The photocells A and B, which are larger than the apertures 32 and 34, are mounted in overlying relation therewith. The apertures 32 and 34 are formed so as to be equal in width to the lines 14. They are spaced apart a distance somewhat less than the length of the lines and positioned so that the right side edge of aperture 32 is parallel to the left side edge of aperture 34. The above-referred to side edges are not necessarily aligned with each other. But if they are not aligned, then the space between each of said side edges and a center line must be equal.

Figure 3:
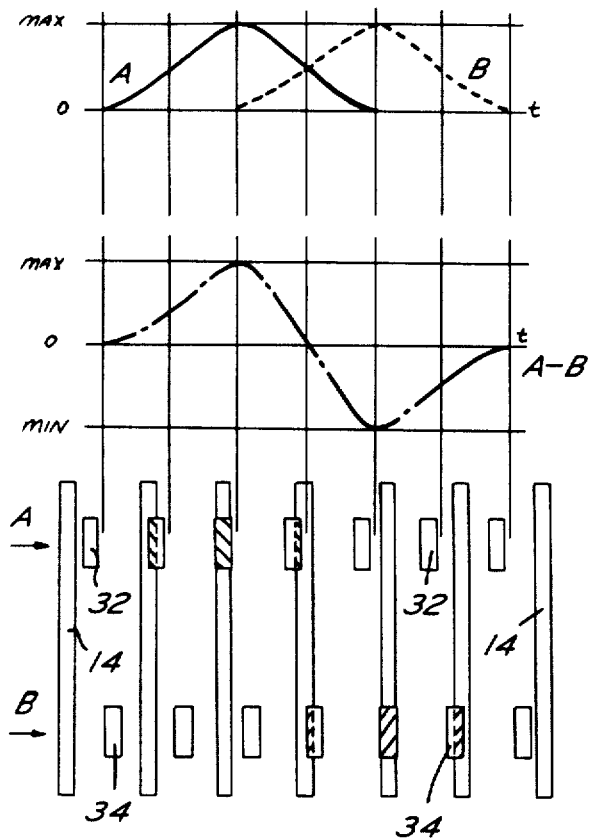
FIGURE 3 is a graphical illustration of the output of the photosensitive devices in response to the position of the object being sensed.

The photocells A and B completely overlie apertures 32 and 34. Accordingly, the photocells will sense the presence of the magnified line image 14 during the time it is focused on the apertures 32 and 34. FIGURE 3 is a graphical illustration of the response of photocells A and B to the presence of the magnified line image 14. The lower portion of FIGURE 3 shows the sequential approach of the magnified line image 14 toward the apertures 32 and 34. The upper graph in FIGURE 3 represents the output of photocells A and B as a function of time. The output values for the photocells A, B are taken along the abscissa or time axis of the graph at points corresponding to the position of the magnified line image in relation to the apertures 32, 34. For example, reading left to right, the first position shows line image 14 just before it passes over aperture 32, while the third sequential position of the line image 14 shows it completely overlying the aperture 32. Accordingly, the output of photocell A is represented first as zero then as a maximum. In the next sequential position, the line image 14 overlies the apertures 32 and 34 by an equal amount. Accordingly, the output of photocells A and B is represented at the same point between zero and maximum.

The second graph in FIGURE 3 represents the result when the output of photocell A is electronically subtracted from the output of photocell B.

Figure 1:
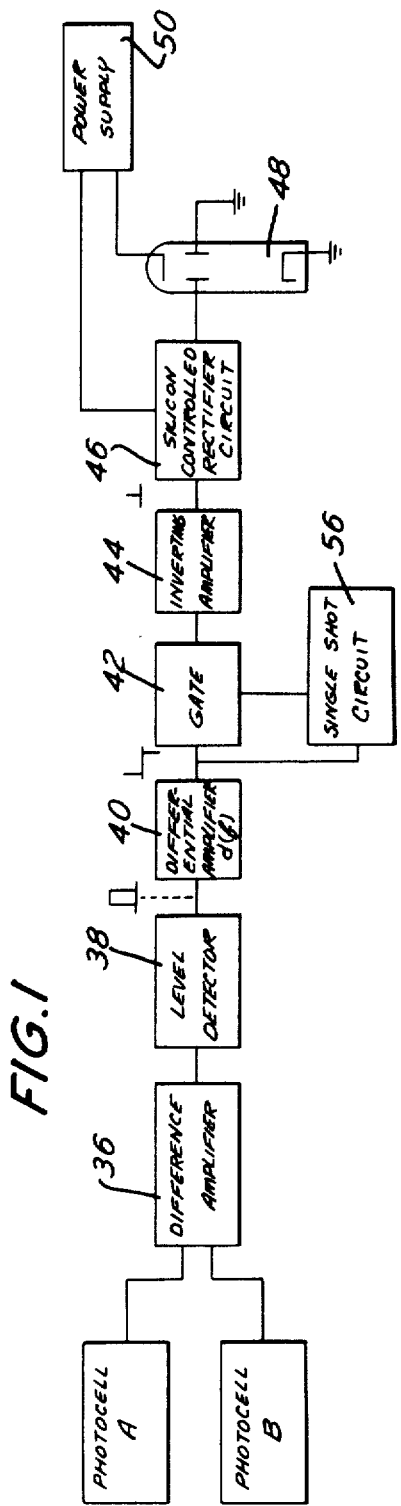
FIGURE 1 is a schematic diagram illustrating in block form the electronic circuit for this invention.

Referring now to FIGURE 1, there is shown a schematic block diagram of the electronic circuitry incorporated in the present invention. The circuitry is shown in block form since each of the elements making up the circuitry is known to those skilled in the art. The invention lies in the combination of these old elements to produce a novel and unobvious result.

Photocells A and B, which are preferably of the photomultiplier type, are connected to a difference amplifier 36 whose output is the difference between the output of photocell A and photocell B. Difference amplifier 36 is connected to level detector 38 which may comprise a Schmitt trigger circuit which senses the output of difference amplifier 36 and generates a signal when that output reaches a predetermined amount. Voltage level detector 38 continues to generate until the output of difference amplifier 36 drops below a predetermined amount. Level detector 38 is connected to a differential amplifier 40 which differentiates the output of level detector 38 and supplies such differential signal to the gate circuit 42. Gate circuit 42 is a normally open gate which is connected to the signal inverting amplifier 44. Amplifier 44 is connected to a silicon controlled rectifier circuit 46 which in turn is connected to a zenon flash lamp 48. A power supply 50 is provided for operating the flash lamp 48. Electrical power for the remaining portion of the circuit is derived from a separate power supply not shown.

Voltage level detector 38 is connected through differential amplifier 40 to the monostable or single shot circuit 46. Circuit 56 is connected to gate 42.

The electromagnetic circuit illustrated in FIGURE 1 operates in the following manner. The output of photocells A and B is illustrated in the upper graph of FIGURE 3. This output is applied to difference amplifier 36 which produces an output similar to that illustrated in the lower graph of FIGURE 3. The lower graph indicates that the output or difference between the signals is zero when the magnified image equally overlies the apertures 32 and 34. This is the point at which it is desirable to initiate operation of the flash lamp 48. Furthermore, it will be assumed throughout this description that the object 12 is moving from left to right in FIGURE 2.

As indicated previously, level detector 38 is conditioned to produce a direct current output only when the difference signal reaches a predetermined level. For convenience of explanation, it will be assumed that the level detector will produce a direct current output when the difference signal from amplifier 36 reaches 10 volts positive and maintains that output until the difference signal falls to zero. Clearly then the output of level detector 38 will appear as the illustrated signal. The differential amplifier will differentiate the leading edge of the rectangular signal thereby producing the illustrated positive spike. Differential amplifier 40 will produce the negative spike when the trailing edge of the rectangular output from level detector 38 is applied to its circuitry.

Normally open gate 42 is biased to a closed position by the circuit 56. To open gate 42, the positive spike from differential amplifier 40 is applied to circuit 56 which flips to its secondary condition for a predetermined period of time, which may be 15 milliseconds. Thus circuit 56 produces a rectangular wave for a predetermined period of time and applies it to gate 42 to open the same. The 15 milliseconds is chosen to be of sufficient length to permit the magnified image 14 to move past photocell B but turns off before the next image reaches photocell A. In other words the negative spike occurs in less than 15 milliseconds.

When negative half of the difference signal is applied to the level detector it will not generate another rectangular wave. The gate 42 therefore is biased closed when the circuit 56 goes to zero.

From the foregoing, it should be apparent that an extremely accurate means for initiating the function of a machine in response to the position of a line object has been described. Accuracy is achieved because the electronic system depends not upon the simple detection of the line, but upon the detection of its leading and trailing edges by the apertures 32 and 34 and the respectively associated photocells A, B.

The circuit illustrated in FIGURE 1 also contains means for preventing the flash lamp 48 from being triggered when the object 12 is reciprocated in the reverse direction. For purposes of this description, the reverse direction will be when it is moved from right to left.

In reciprocating the object 12 in a reverse direction, the effect of a particular magnified line image 14 upon the photocells A, B is in the inverse of that illustrated in FIGURE 3; that is, photocell B will reach its maximum output before photocell A. Accordingly, the difference signal will also be inverted so that it first dips to a minimum and then passes through zero and goes to a maximum. It is this inverted signal that is applied to level detector 38 and circuit 56.

Under these conditions the level detector 38 will produce a negative rectangular wave. When differentiated by differential amplifier 40, the result is first a negative and then a positive spike. Therefore the circuit 56, which is responsive only to positive spikes, will fire after the negative spike has been created. Gate 42 will only accept a negative spike and there is none available. Therefore the flash lamp 48 is not fired. The only way the flash lamp 48 can be fired during reciprocation of the object 12 is for a stray negative spike to enter the circuit during the 15 milliseconds that the circuit 56 is on. However, the chances of this occurring are so small as to be insignificant.

There is, however, the possibility that the circuit 56 will be on at the end of a reciprocation of the object 12 and as it is starting in the forward condition. To avoid this a negative spike is applied from a relay and capacitor to fire the system and set it in condition for operation in the forward direction.

Figure 5:
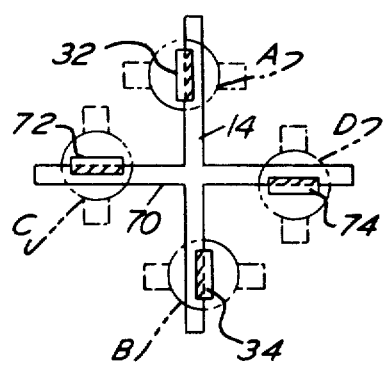
FIGURE 5 is an enlarged view showing the representation of a magnified image when an alternative object is used.
Figure 6:
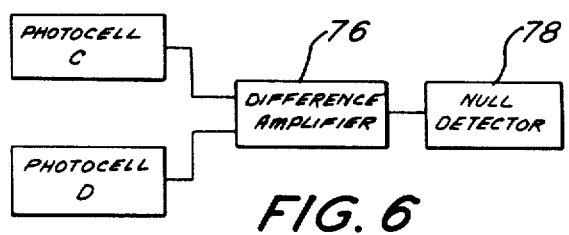
FIGURE 6 is a schematic diagram illustrating in block form the electronic circuit for a second embodiment of this invention.

For certain types of machines it may be desirable to detect the position of the object 12 along a coordinate axis normal to the axis of movement described above. In the first embodiment of this invention, photocells A and B merely detect the position of the object 12 along the X-axis. The modification illustrated in FIGURES 5 and 6 enables the machine to detect positions along the normal or coordinate axis which may be referred to as a Y-axis.

To detect coordinate axis, the object 12 is now provided with cross hairs represented by the line image 70. The line image 70 is focused on a plane having four apertures 32, 34, 72 and 74, behind which are mounted the photocells A, B, C and D. Apertures 32 and 34 as well as photocells A and B are the same as the photocells illustrated in FIGURE 4. Apertures 72 and 74, are positioned with their longitudinal axes normal to the longitudinal axis of the apertures 32 and 34. Otherwise, they are arranged in a similar manner; that is, they are positioned so that they will sense the side edges of the horizontal arm of image 70.

Photocells C and D completely overlie the apertures 72 and 74 so as to sense the light passing therethrough.

Photocells A and B are connected to an electronic circuit which is the same as that illustrated in FIGURE 1. Photocells C and D are connected to the electronic circuit illustrated in FIGURE 6. Thus, photocells C and D are connected to a difference amplifier 76 which in turn is connected to a null detector 78. The difference amplifier 76 can be any conventional amplifier of this type. The null detector 78 may be a meter or an oscilloscope. The effect of the horizontal arm of cross hair 70 upon photocells C and D is the same as that illustrated in FIGURE 3. In other words the difference amplifier will have a zero or null output when the horizontal cross line is equally positioned over apertures 72 and 74. The null detector 78 will sense this and thus indicate that the object 12 is properly positioned on the Y-axis. The X-axis triggering is effected in exactly the same manner that is described above. If desired, the null detector 78 could be connected to a blocking circuit or electronic switch interposed in the circuit of FIGURE 1. The switch would be arranged to permit operation of the circuit illustrated in FIGURE 1 only when the object is properly positioned along the Y-axis.

The present invention may be embodied in other specific forms without departing from the spirit or essential attributes thereof and, accordingly, reference should be made to the appended claims, rather than to the foregoing specification as indicating the scope of the invention.

I claim:

1. Position sensing apparatus comprising first and second transducer means for optically sensing a moving object at two distinct positions, means for electrically combining the outputs of said transducer means to produce a combined signal, means responsive to said combined signal for generating an output voltage when said combined signal reaches a predetermined level and sustaining said output voltage until said combined signal drops below a predetermined level, means for detecting when said voltage changes in response to said drop in said combined signal below said predetermined level and generating a triggering pulse in response to said change, and means including a gate and a control for said gate for applying said triggering pulse to initiate a machine function.

2. Position sensing apparatus in accordance with claim 1 including an optical magnifying system for focusing an enlarged image of a mark on said object onto said first and second transducer means, said transducer means being spaced apart photo-sensitive devices.

3. A position sensing apparatus in accordance with claim 1 including electronic circuit means for preventing said sensing means from generating a trigger pulse when the object is moving in a direction other than a first predetermined direction.

4. A position sensing apparatus in accordance with claim 1 including electronic circuit means for preventing said sensing apparatus from generating a triggering pulse when the object being sensed is moved in any direction except a first predetermined direction, said preventing means including electronic gate means adapted to pass said triggering pulse only when it is of a predetermined polarity, means for opening and closing said gate circuit, said opening and closing means being responsive only to a pulse of opposite polarity to said triggering pulse, said detecting means including means for generating said pulse of opposite polarity and then said triggering pulse in that order only when said object is moved in said first predetermined direction.

5. Position sensing apparatus in accordance with claim 1 wherein said first and second transducer means include spaced apart photosensitive devices, optical means for focusing an enlarged image of a graduation associated with said object onto said photosensitive devices, said photosensitive devices being positioned to simultaneously sense the leading and trailing edges of the enlarged image of said graduation.

6. Position sensing apparatus in accordance with claim 1 wherein said combining means is a difference amplifier, said responsive means being a level detector for generating a rectangular wave, and said detecting means is a differentiating circuit for producing positive and negative pulses in response to said rectangular wave.

7. Position sensing apparatus in accordance with claim 1 wherein said machine function is a power supply, switch control circuit and flash lamp for generating a pulse of light energy.

8. A position sensing apparatus in accordance with claim 1 wherein said first and second transducer means comprise a pair of photosensitive devices mounted in spaced apart relationship, said means for electrically combining the output of said transducer means being a difference amplifier for producing an output signal which is the difference between the signal generated by said photosensitive devices, said means responsive to said combined signal being a level detector for generating a direct current voltage when said difference signal reaches a predetermined level and sustaining said voltage until said combined signal drops to zero thereby producing a voltage signal of rectangular wave form, said detecting means being a differential amplifier for producing a positive spike in response to the leading edge of said rectangular wave and a negative spike in response to the trailing edge, gate circuit means adapted to pass only a negative signal in its open condition and no signal in its closed condition, gate control means connected to said difference amplifier and said gate, said gate control means biasing said gate into its open condition when a positive pulse is applied thereto and maintaining said gate in open condition for a predetermined amount of time sufficient to permit said negative pulse to pass.

9. Positive sensing apparatus in accordance with claim 1 including an optical system for magnifying scaler lines on said moving object and focusing magnified images of said scaler lines on said transducer means, said transducer means being positioned so that one will detect the leading edge and the other the trailing edge of said optical image at a predetermined position of said image, said combining means being a difference amplifier for producing a difference signal which is zero when said image is equally positioned on said first and second transducer means, said means for generating said output voltage sustaining said output voltage until said difference signal drops to zero, whereby said triggering pulse is generated when said image is equally positioned on said first and second transducer means.

10. Position sensing apparatus in accordance with claim 1 including a third and fourth transducer means for optically sensing a moving object at two distinct positions other than said first mentioned positions, means for electrically combining the output of said transducer means, means responsive to said combine signal for indicating when said object is in a predetermined position.

11. Position sensing apparatus in accordance with claim 10 wherein said transducer means sense a mark on said object, said first and second transducer means being positioned to sense a first coordinate axis of said mark and said third and fourth transducer means being positioned to sense a second coordinate axis of said mark.

References Cited

UNITED STATES PATENTS

| | | | |
|---|---|---|---|
| 3,038,369 | 6/1962 | Davis | 250—232 X |
| 3,096,441 | 7/1963 | Burkhardt | 250—231 X |
| 3,207,904 | 9/1965 | Heinz | 250—202 |

WALTER STOLWEIN, *Primary Examiner*.

U.S. Cl. X.R.

88—14; 250—237